US011618684B2

(12) United States Patent
Ribeiro et al.

(10) Patent No.: US 11,618,684 B2
(45) Date of Patent: Apr. 4, 2023

(54) METHOD FOR CONTROLLING THE PROPERTIES OF BIOGENIC SILICA (71) Applicant: KILT, LLC, Jonesboro, AR (US)

(72) Inventors: Flavio Ernesto Ribeiro, Plainfield, IL (US); Larry W. Shipley, Jonesboro, AR (US); Leo Gingras, Kinder, LA (US)

(73) Assignee: KILT, LLC, Jonesboro, AR (US)

( * ) Notice: Subject to any disclaimer, the term of this patent is extended or adjusted under 35 U.S.C. 154(b) by 675 days.

(21) Appl. No.: 16/549,667

(22) Filed: Aug. 23, 2019

(65) Prior Publication Data
US 2020/0071170 A1 Mar. 5, 2020

Related U.S. Application Data (60) Provisional application No. 62/830,054, filed on Apr. 5, 2019, provisional application No. 62/727,183, filed on Sep. 5, 2018.

(51) Int. Cl.
C01B 33/12 (2006.01)

(52) U.S. Cl.
CPC ........ C01B 33/124 (2013.01); C01P 2002/02 (2013.01); C01P 2006/12 (2013.01); C01P 2006/14 (2013.01); C01P 2006/16 (2013.01)

(58) Field of Classification Search
None
See application file for complete search history.

(56) References Cited

U.S. PATENT DOCUMENTS

| 833,940 A | 10/1906 | Rixson |
| 1,293,008 A | 2/1919 | Blardone |

(Continued)

FOREIGN PATENT DOCUMENTS

| CN | 101146744 A | 3/2008 |
| DE | 259526 | 5/1913 |

(Continued)

OTHER PUBLICATIONS

Umeda et al (High-purification of amorphous silica originated from rice husks by combination of polysaccharide hydrolysis and metallic impurities removal, Industrial Crops and Products 32 (2010), pp. 539-544). (Year: 2010).*

Bakar et al (Production of High Purity Amorphous Silica from Rice Husk, Procedia Chem 19 (2016) 189-195). (Year: 2016).*

(Continued)

Primary Examiner — Colin W. Slifka
Assistant Examiner — Michael Forrest
(74) Attorney, Agent, or Firm — Buchanan Ingersoll & Rooney PC (57) ABSTRACT Porous amorphous silica can be obtained from siliceous plant matter containing non-siliceous inorganic substances. The siliceous plant matter is soaked in an aqueous solution which includes a chelating agent. The chelating agent is present in an amount which helps to extract at least some of the non-siliceous inorganic matter. The aqueous solution is then separated from the siliceous plant matter. Beneficial properties are imparted to the siliceous plant matter by controlling the amount of at least one preselected non-siliceous inorganic substance in the siliceous plant matter. At the end of the process, the siliceous plant matter is heat treated in the presence of oxygen at a temperature to produce the resulting amorphous silica having the beneficial properties.

22 Claims, 2 Drawing Sheets (56) References Cited

U.S. PATENT DOCUMENTS

| | | | |
|---|---|---|---|
| 3,125,043 | A | 3/1964 | Gravel |
| 3,754,076 | A | 8/1973 | Cutler |
| 3,959,007 | A | 5/1976 | Pitt |
| 4,105,459 | A | 8/1978 | Mehta |
| 4,214,920 | A | 7/1980 | Amick et al. |
| 4,274,344 | A | 6/1981 | Nider |
| 4,422,297 | A | 12/1983 | Rejoy |
| 4,973,462 | A | 11/1990 | Akira et al. |
| 5,503,931 | A | 4/1996 | Goodman, Sr. |
| 5,658,548 | A | 8/1997 | Padhye et al. |
| 5,769,034 | A | 6/1998 | Ha et al. |
| 5,833,940 | A | 11/1998 | Reiber et al. |
| 6,183,597 | B1 | 2/2001 | Siegle |
| 6,375,735 | B1 | 4/2002 | Stephens et al. |
| 6,406,678 | B1 | 6/2002 | Shipley |
| 7,270,794 | B2 | 9/2007 | Shipley |
| 8,057,771 | B2 | 11/2011 | Shipley |
| 2003/0133863 | A1 | 7/2003 | Kang |
| 2006/0222582 | A1 | 10/2006 | Shipley |
| 2010/0061910 | A1 | 3/2010 | Kondoh et al. |

FOREIGN PATENT DOCUMENTS

| | | |
|---|---|---|
| EP | 1381563 A1 | 1/2004 |
| EP | 1866249 A1 | 12/2007 |
| JP | 52136892 A | 11/1977 |
| JP | 0848515 A | 2/1996 |
| WO | 2017022345 A1 | 4/2018 |

OTHER PUBLICATIONS

Mahmud et al ("Acid Leaching as Efficient Chemical Treatment for Rice Husk in Production of Amorphous Silica Nanoparticles", vol. 11, No. 22, (2016) 13384-13388). (Year: 2016).*

"Effect of Organic Acid Treatment on the Properties of Rice Husk Silica" by S. Chandrasekhar, P. N Pramada, L. Praveen; Journal of Materials Science 40 (2005) 6535-6544; published Oct. 25, 2005.

International Search Report for PCT/US2019/048108 dated Nov. 15, 2019.

Written Opinion of the International Searching Authority for PCT/US2019/048108 dated Nov. 15, 2019.

Search Report for Taiwanese Patent Application No. 108131783 dated Mar. 24, 2020.

* cited by examiner

METHOD FOR CONTROLLING THE PROPERTIES OF BIOGENIC SILICA

CROSS-REFERENCE TO RELATED APPLICATIONS

This patent application claims the benefit of priority to U.S. Provisional Patent Application Ser. No. 62/830,054, filed on Apr. 5, 2019, and to U.S. Provisional Patent Application Ser. No. 62/727,183, filed on Sep. 5, 2018, the entire contents of both of which are incorporated herein by reference.

BACKGROUND OF THE INVENTION

Field of the Invention

The invention disclosed and claimed relates to a method for controlling the properties of biogenicly-derived silica. With more particularity the invention herein set forth relates to methods to selectively enhance desired properties of amorphous silica recovered from the renewable resource of siliceous plants, including rice hulls, stalks and leaves.

Description of Related Art

Amorphous silica is currently manufactured, marketed and utilized for numerous purposes. U.S. Pat. Nos. 6,406,678; 7,270,794; and 8,057,771 to Shipley, each of which is incorporated herein by reference, demonstrate a process to recover amorphous silica from biogenic sources such as rice hulls. Amorphous silica exists in siliceous plant matter in a lattice-like structure, intimately interlaced with various organic compounds, such as cellulose, lignin, hemicellulose and various inorganic matter including phosphates, salts, gels, hydrates and oxides. Typical inorganic substances in the rice hull composition are elements or various compounds of phosphorous, potassium, calcium, magnesium, manganese, sodium, iron, zinc and aluminum. Removal of these organic and inorganic substances by washing or chelation followed by heat treatment leaves substantially pure amorphous silica having high porosity (as it exists in the plant matter) has been problematic. Removal of carbon and organic impurities is commonly incomplete if the plant matter is heat treated at low temperature. Heat treatment at any temperature doesn't commonly remove all carbon. Heat treatment at any temperature has little effect on inorganic impurities. Heat treatment at greater temperatures causes fluxing of the lattice-like structure of the silica, reducing its porosity (the effective surface area per unit of weight) pore volume, and pore diameter, while entrapping impurities within said structure. Heat treatment at even higher temperatures causes undesirable crystallization of the silica. Heat treatment alone does little to remove inorganic impurities. Post-heat treatment removal of inorganic impurities from the silica is problematic if the silica was fluxed during heat treatment.

U.S. Pat. Nos. 6,406,678; 7,270,794; and 8,057,771 disclose a means by which amorphous silica of selected characteristics (including the amount of carbon, inorganic impurities and porosity), may be extracted; lignin, hemicellulose, cellulose derived sugars and useable energy (open loop renewable energy) may also be extracted, from siliceous plant matter, such rice hulls, straw and leaves, by means which is environmentally friendly (does not carbonize the atmosphere, has decreased nitrogen oxide and sulfur emissions and does not involve the use of toxic or polluting chemicals).

The siliceous plant matter may be, according to the nature and quality of the end-products desired, subjected to steeping in water, separation of steep-water and processing of the solids to cause reduction of hydrocarbons and/or removal of inorganic compounds prior to heat treatment. Lignin, hemicellulose and cellulose derived sugars may be recovered from water used to steep and/or soak the siliceous plant matter. Heat treatment of the solids in the presence of oxygen yields a siliceous ash. By varying the steps prior to heat treatment and the temperature of heat treatment, the resulting siliceous ash may have no detectable crystalline content or selectively contain more or less amorphous or crystalline silica, more or less carbon, more or less inorganic residue and have desired porosity.

Treatment steps prior to heat treatment may selectively include: steeping in water; removing the steep-water; reducing organic compounds of the solids by soaking in an aqueous solution containing an oxidizing solute; extracting inorganic compounds of the solids by soaking in an aqueous solution containing chelating agents, mineral and/or organic acids; and rinsing and drying said solids. The remaining solids are then exothermically heat treated in the presence of oxygen, typically at a temperature below that which causes crystalline silica to form. Removal of impurities significantly raises the temperature at which crystalline structures form. Energy from heat treatment may be captured for beneficial use thereof, including the generation of electrical energy. Following heat treatment, the resulting siliceous ash, (comprising amorphous silica) may be washed with water and/or subject to a variety of chelate and/or chemical rinses for removal of even more impurities. Lignin, hemicellulose, and cellulose derived sugars may be recovered from the steep water. By removing lignin, hemicellulose, and cellulose derived sugars prior to heat treatment, nitrogen oxide and sulfur emissions resulting from heat treatment are reduced.

SUMMARY OF THE INVENTION

It has been found that desired properties of amorphous silica derived from biogenic sources such as rice hulls can be obtained by manipulating the amount and nature of impurities in the plant matter prior to heat treatment. By selecting the amount and type of flux agents retained in the plant matter, an amorphous silica can be produced having desired surface area, pore volume, pore dimension, abrasiveness and dispersibility properties.

Porous amorphous silica can be produced from siliceous plant matter containing non-siliceous inorganic matter by first soaking the siliceous plant matter in an aqueous solution including a chelating agent present in an amount sufficient to extract at least some of the non-siliceous inorganic matter. The aqueous solution is separated from the siliceous plant matter and the amount of preselected non-siliceous inorganic substances in said siliceous plant matter is controlled so as to impart beneficial properties to the siliceous plant matter. Finally, the siliceous plant matter is heat treated in the presence of oxygen at a temperature wherein resulting in silica in a porous amorphous form.

The process herein described is directed to beneficial use of siliceous plant matter, such as rice bulls, straw and leaves, to produce a variety of products, such as silica, lignin, and hemicellulose, cellulose derived sugars and usable energy, by means which does not carbonize the atmosphere, has decreased nitrous oxide and sulfur emissions and does not employ the use of harsh, polluting chemicals.

In the process for producing amorphous silica from siliceous plant matter containing inorganic and organic compounds, the siliceous plant matter is soaked in an aqueous solution of citric acid, other chelating agents and/or mineral acids. The chelating agents and/or mineral aids are present in an amount which extracts at least some of said inorganic and organic compounds. The aqueous solution is separated from the siliceous plant matter. The siliceous plant matter is then heat treated in the presence of oxygen so that the resulting silica is in an amorphous form. The removal of said inorganic compounds can be controlled by the amount of chelating agents, mineral acids and other variables such as temperature, time and removal process with washing. For a given inorganic substances final content in the silica matrix the heat treatment temperature can be manipulated to give specific surface area, pore characteristics and dispersibility of the silica.

The present invention provides advantages over the prior methods for producing biogenic silica. By evaluating the amount of non-siliceous inorganic substances present in a given feedstock, the amount of chelating agents needed to achieve a specific impurities concentration can be predetermined. The present invention provides a more efficient and possibly greater reduction of non-siliceous inorganic substances in the chelation step. The present invention can be used to create a variety of amorphous silica products with various controlled specific surface areas, pore volumes, pore dimensions, abrasiveness and dispersibility by controlling the level of non-siliceous inorganic substances (that act as flux agents during heat treatment and result in the collapse of the silica matrix) in the biogenic source for a fixed heat treatment temperature value. The present invention can be used to create a variety of silica products with various specific surface areas, pore volumes, pore dimensions, abrasiveness and dispersibility by controlling heat treatment temperature in the presence of oxygen. The present invention allows for the post-treatment of the silica to further reduce inorganic substances content.

PREFERRED EMBODIMENT OF THE INVENTION

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof which are within the scope of the appended claims.

Porous amorphous silica can be obtained from siliceous plant matter containing non-siliceous inorganic matter. In prior practice, the non-siliceous inorganic matter would be removed during a soaking and chelation step. It has been found that if certain of the non-siliceous inorganic matter is preferentially retained within the plant matter prior to heat treatment, preferred properties can be imparted to the resulting amorphous silica.

In a presently preferred method, the siliceous plant matter is soaked in an aqueous solution comprising a chelating agent. The chelating agent is present in an amount which extracts at least some of the non-siliceous inorganic matter. The aqueous solution is then separated from the siliceous plant matter. Beneficial properties are imparted to the siliceous plant matter by controlling the amount of at least one preselected non-siliceous inorganic substance in the siliceous plant matter. At the end of the process, the siliceous plant matter is heat treated in the presence of oxygen at a temperature wherein the resulting silica is comprised of silica of porous amorphous form.

The preselected non-siliceous inorganic substances can include any or all of the following materials: elements or compounds of alkali metals (most preferably from lithium, sodium, and potassium), alkali earth metals (most preferably magnesium and calcium), aluminum, boron, iron, manganese, titanium, or phosphorus.

One method of controlling the amount of the preselected non-siliceous inorganic substance is to control the amount of chelating agents in the siliceous matter. Suitable chelating agents include citric acid, acetic acid, ethylenediamine, ethylenediaminetetracetic acid, dimercaptosuccinic acid, trimethylaminetricarboxylic acid, alphalipoic acid, and diethylenetriaminepentaacetic acid. Preferably, the amount of chelating agent is maintained between 0.001 kg per kg of plant matter to 1 kg per kg of plant matter. In the case of a citric acid chelating agent, the amount of citric acid preferably ranges between 0.01 kg per kg of plant matter to 0.1 kg per kg of plant matter. By controlling the amount of chelating agent present in the plant material, the amount of non-siliceous inorganic substances remaining in the plant matter can be established at a preselected amount sufficient to impart desired properties to the silica resulting from the heat treatment of the plant matter.

An alternative method of controlling the amount of the preselected non-siliceous inorganic substance is to introduce mineral acids to interface with the siliceous plant matter. Suitable mineral acids include sulfuric acid, nitric acid, hydrochloric acid, phosphoric acid, boric acid, and perchloric acid. The mineral acids will aid to extract some of the non-siliceous inorganic substances, with a portion remaining in the plant matter. The remaining non-siliceous inorganic substances are selected to impart desired properties to the silica resulting from the heat treatment of the plant matter.

An additional method of controlling the amount of the preselected non-siliceous inorganic substance is to control the amount of chelating agent added to the aqueous solution when soaking the plant matter. It has been found that the amount of the preselected inorganic non-siliceous substances can be manipulated within a range of 20 ppm to 25,000 ppm, and more preferably within a range of 300 ppm and 15,000 ppm, by controlling the amount of chelating agent added to the aqueous solution.

A further method of controlling the amount of the preselected non-siliceous inorganic substance is to add back to the plant matter a desired amount of a preselected non-siliceous inorganic substance in an amount sufficient to impart desired properties to the silica once the plant matter has been heat treated.

A further method of controlling the amount of the preselected non-siliceous inorganic substance is to add back to the plant matter a desired amount of a preselected non-siliceous inorganic substance in an amount sufficient to impart desired properties to the silica once the plant matter has been heat-treated. It has been found that the alkali metals (more specifically lithium, sodium, and potassium) have a strong influence on the properties of the silica; an increased amount of these alkali metals results in a decrease of the surface area and pore volume, when compared to a control. It has also been found that the alkaline earth metals (more specifically magnesium and calcium) will have a moderate influence on the properties of the silica; an increased amount of those elements will also result in a decrease of the surface area and pore volume. Finally, it has been found that other typical inorganic impurities will not influence the properties of the silica (more specifically boron, zinc, aluminum, manganese, phosphorous, and iron).

One of the properties of the amorphous silica that can be controlled using the method of the present invention is the surface area of the silica. It has been found that the surface area of the amorphous silica can be controlled within a narrow range within the broader range of 10 $m^2/g$ and 450 $m^2/g$, and more preferably, within a narrow range within the broader range of 30 $m^2/g$ and 400 $m^2/g$.

Another property of the amorphous silica that can be controlled using the method of the present invention is the pore volume of the silica. It has been found that the pore volume of the amorphous silica can be controlled in a narrow range within the broader range of 0.50 cc/g and 0.05 cc/g, and more preferably, within a narrow range within the broader range of 0.40 cc/g and 0.10 cc/g.

A further property of the amorphous silica that can be controlled using the method of the present invention is the pore diameter of the silica. It has been found that the pore diameter of the amorphous silica can be controlled in a narrow range within the broader range of 10 Angstroms and 200 Angstroms, and more preferably, within a narrow range within the broader range of 30 Angstroms and 100 Angstroms.

It has been found that the content of non-siliceous inorganic substances in the heat treated silica can be controlled in a range within the range of 10 ppm and 1,000 ppm, and more preferably, in a range within the range of 100 ppm and 500 ppm, by post washing the silica with at least one of water, mineral acids, chelants, and pH adjustment chemicals.

The preferred heat treatment temperature is in the range of 200° C. to 1,000° C.

Certain aspects of the invention are demonstrated in the following experiments.

Experiment 1

Several tests were conducted using identical mixing systems comprised of a top entering mechanical mixer, hot plate (preferably with temperature feedback) and a 2-liter capacity beaker. One test was a control and the other tests used different citric acid chelating agent concentrations. The test procedure was as follows:

1. Each beaker was filled with 1,800 ml. of 160° F. distilled water.
2. 100 grams of 60 mesh ground rice hulls (from the same sample batch) were added to each beaker and the mixers were operated at identical speeds. Hot plates were set to the same (low) level of heating or if they have a feedback mechanism were set to 160° F.
3. The control batch was filtered to remove water, post dried at 50° C., and heat treated at 600° C. Silica was analyzed for inorganic elements content.
4. The other batches were treated with increased amounts of a 10% solution of citric acid while allowing time for proper chelation, followed by a sequence of purified water soak and drain cycles. A 30% hydrogen peroxide solution was added into the previous cycle to the final wash. Material from the tests were filtered out to remove water, post dried at 50° C. and heat treated at 600° C. Silica was analyzed for inorganic elements content Once the treated hull samples were analyzed for residual inorganic elements via ICP, the relative removal rates of each treatment were compared. The results of the comparison are presented in Table 1 below:

TABLE 1

| ppm ICP OES | +60 Mesh Control | 5 g 10% citric/ 100 g rice hulls | 10 g 10% citric/ 100 g rice hulls | 20 g 10% citric/ 100 g rice hulls | 30 g 10% citric/ 100 g rice hulls | 40 g 10% citric/ 100 g rice hulls | 50 g 10% citric/ 100 g rice hulls | 60 g 110% citric/ 100 g rice hulls |
|---|---|---|---|---|---|---|---|---|
| Li | 3 | 3 | 3 | 2 | 2 | 3 | 4 | 4 |
| Al | 19 | 10 | 24 | 17 | 11 | 14 | 9 | 17 |
| B | 29 | 19 | 22 | 16 | 15 | 10 | 19 | 15 |
| Fe | 87 | 65 | 63 | 69 | 58 | 60 | 59 | 56 |
| P | 726 | 193 | 205 | 230 | 247 | 331 | 305 | 269 |
| Ca | 3,305 | 1,860 | 1,444 | 812 | 452 | 335 | 223 | 203 |
| K | 6,367 | 51 | 44 | 27 | 17 | 23 | 47 | 37 |
| Mg | 985 | 312 | 199 | 119 | 69 | 69 | 53 | 49 |
| Na | 193 | 29 | 18 | 77 | 39 | 27 | 7 | 20 |
| Flux (K, Na, Ca, Mg) | 10,850 | 2,252 | 1,705 | 1,035 | 577 | 454 | 330 | 309 |

As shown in Table 1, increased amounts of citric acid will improve inorganic substances removal. The removal can be modeled assuming 1 mol of citric acid will chelate 1 mol of the element. Therefore specific inorganic elements concentration, in particular flux elements (such as K, Na, Ca, Mg) that will affect final silica product properties such as surface area, pore volume, pore diameter and dispersibility can be achieved with a specific amount of citric acid concentration, for a given feedstock.

Experiment 2

An experiment was conducted to determine other ways to further reduce inorganic substances in the chelation step. Four tests were conducted using identical mixing systems comprised of a top entering mechanical mixer, hot plate (preferably with temperature feedback) and a 2-liter capacity beaker. One test was a control and the other tests used citric acid chelating agents on the same concentrations. One test had the introduction of a mineral acid during the chelation and the other test had the introduction of a mineral acid on a soak step prior to the chelation step to further reduce pH of the solution. The test procedure was as follows:

1. Each beaker was filled with 1,800 ml of 160° C. distilled water.
2. 100 grams of +60 mesh ground rice hulls (from the same sample batch) were added to each beaker and the mixers were operated at identical speeds. Hot plates were set to the same (low) level of heating or if they have a feedback mechanism were set to 160° F.
3. Control batch was filtered out to remove water, post dried at 50° C. and heat treated at 600° C. Silica was analyzed for inorganic elements content.
4. The second batch was treated with a 10% solution of citric allowing time for proper chelation, followed by a sequential of purified water soak and drain cycles. A 30% hydrogen peroxide solution was added into the previous cycle to the final wash. Material from the tests was filtered out to remove water, post dried at 50° C. and heat treated at 600° C. Silica was analyzed for inorganic elements content.
5. The third batch was treated with a 10% solution of nitric acid, 50% of the total 30% hydrogen peroxide and a 10% solution of citric allowing time for proper chelation, followed by a sequential of purified water soak and drain cycles. The remaining 50% of the 30% hydrogen peroxide solution was added into the previous cycle to the final wash. Material from the tests was filtered out to remove water, post dried at 50° C. and heat treated at 600° C. Silica was analyzed for inorganic elements content.
6. The fourth batch was treated with a 10% solution of nitric and 50% of the total hydrogen peroxide on an initial soak step. This soak step was conducted prior to the chelation. The soak was followed by a chelation step with 10% citric acid solution and a sequential of purified water soak and drain cycles. The remaining 50% of the 30% hydrogen peroxide solution was added into the previous cycle to the final wash. Material from the tests was filtered out to remove water, post dried at 50° C. and heat treated at 600° C. Silica was analyzed for inorganic elements content.

Once the treated hull samples were analyzed for residual inorganic element impurities via ICP, the relative removal rates of each treatment were compared. The results of the comparison are presented in Table 2 below:

TABLE 2

| ppm ICP OES | +60 Mesh Control | 10 g 10% citric chelation/ 100 g rice hulls | 10 g 10% nitric + 10 g 10% citric chelation/ 100 g rice hulls | 10 g 10% nitric soak followed by 10 g citric chelation/100 g rice hulls |
|---|---|---|---|---|
| Li | 3 | 3 | 2 | 2 |
| Al | 19 | 24 | 10 | 15 |
| B | 29 | 22 | 15 | 5 |
| Fe | 87 | 63 | 47 | 53 |
| P | 726 | 205 | 220 | 274 |
| Ca | 3,305 | 1,444 | 86 | 144 |
| K | 6,367 | 44 | 10 | 6 |
| Mg | 985 | 199 | 32 | 42 |
| Na | 193 | 18 | 8 | 4 |
| Flux (K, Na, Ca, Mg) | 10,850 | 1,705 | 136 | 196 |

As shown in Table 2, the addition of a mineral acid to promote a pH change in the chelation process or in a presoak process preceding chelation increased amounts of inorganic substances removed from the rice hulls. It is noted that citric acid buffer the solution pH to 3 and the mineral acid will promote further reduction to a pH of 2 in this example. With the test results it is possible to see that further purification of a silica can be achieved by various methods of washing, with or without chemical agents and at temperature ranges.

Experiment 3

An experiment was conducted to determine the ability to control the surface area, pore characteristics and dispersibility by controlling the level of flux agents on the rice hull composition. In current practice, the goal is to remove inorganic substances that can act as flux agents as fully as possible before combustion in order to yield a high surface area and good dispersibility. Controlling the level of inorganic substances remaining in the rice hulls will provide lower surface areas and greater degrees of abrasiveness. Because silica qualities may also be affected by combustion temperatures, a 600° C. combustion temperature was used for all evaluations.

Figure 1:
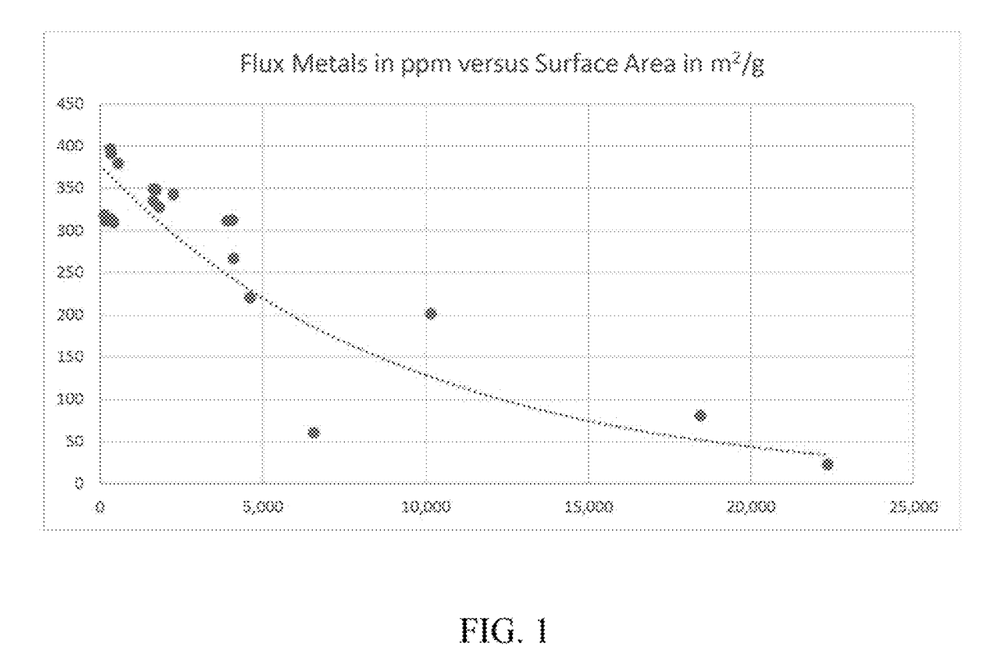
FIG. 1 is a graph showing the results of an experiment to determine the ability to control the surface area of biogenic silica by controlling the total content of non-siliceous inorganic substances (flux agents) retained in the rice hull composition.
Figure 2:
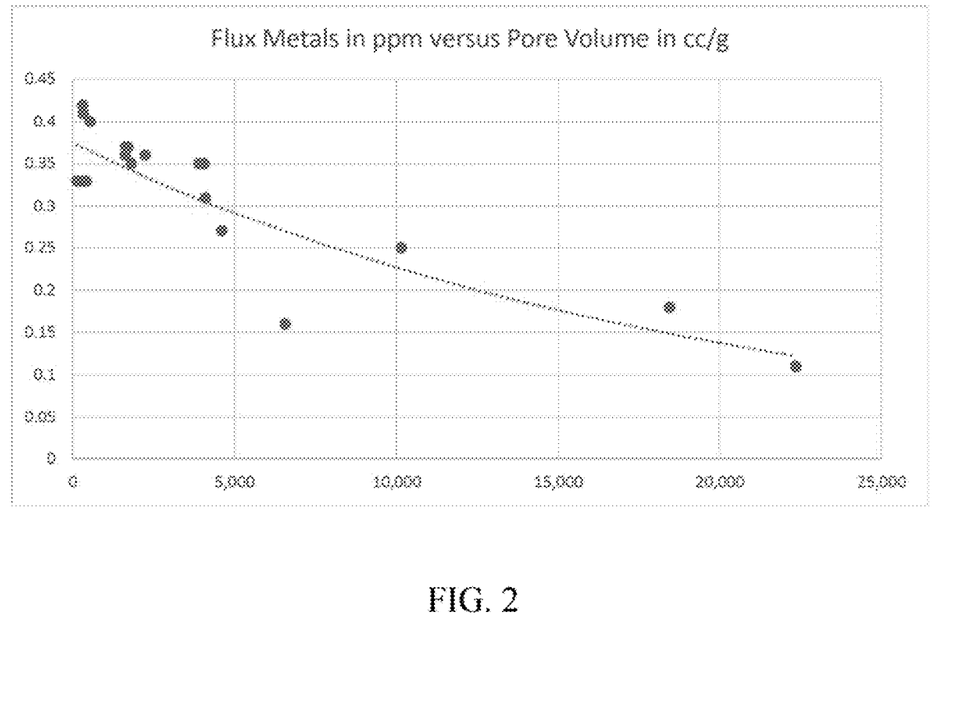
FIG. 2 is a graph showing the results of an experiment to determine the ability to control the pore characteristics of biogenic silica by controlling the non-siliceous inorganic substances (flux agents) retained in the rice hull composition.

Several samples of various batches with different inorganic element impurities concentrations, that can act as flux agents (expressed by the sum of Na, K, Ca and Mg) were heat treated at 600° C. The silica was analyzed for flux agents (Na, K, Ca and Mg), surface area and pore volume. The results where plotted on the graphs shown in FIGS. 1 and 2:

With the test results it is possible to see that silica properties such as surface area, pore volume and pore diameter, leading to other important properties such as dispersibility and abrasivity can be obtained with a specific flux agent element concentration at a given heat treatment temperature.

An experiment was conducted to evaluate the changes in surface area, pore volume, and pore diameter of a given batch of treated rice hulls, with a specific flux agent (expressed by the sum of Na, K, Ca and Mg) level content. The treated rice hull batch was heat treated at four different temperatures and results are shown in Table 3 below:

TABLE 3

| Samples | Temperature (C.) | Flux Agents (ppm) | SA (m2/g) | PV (m3/g) | Pore Width (Å) |
|---|---|---|---|---|---|
| 41118 #3 | 600 | 238 | 326 | 0.34 | 42.19 |
| 41118 #3 | 700 | 238 | 301 | 0.32 | 43.28 |
| 41118 #3 | 800 | 238 | 264 | 0.29 | 44.72 |
| 41118 #3 | 900 | 238 | 196 | 0.24 | 48.20 |

With the tests results it is possible to see that a given treated rice hull will produce different results of pore volume, surface area and pore diameter on different heat treatment temperatures, being able then to be manipulated for a specific final product desired property Experiment 5

An experiment was conducted to evaluate the effect of post washing the silica to further eliminate metals and achieve higher degrees of purification.

Several tests were conducted using identical mixing systems comprised of a magnet, hot plate (preferably with temperature feedback) and a 500 ml capacity beaker. One test was a control and the other tests used different citric acid chelating concentrations. The test procedure was as follows:
  1. Each beaker was filled with 300 ml. of 160° F. distilled water.
  2. 30 grams of silica (from the same sample batch) were added to each beaker and the mixers were operated at identical speeds. Hot plates were set to the same (low) level of heating or if they have a feedback mechanism were set to 160° F.
  3. Control silica was analyzed for metals content.
  4. The other batches were treated with increased amounts of a 10% solution of citric, followed by one of purified water soak and drain cycles. Material from the tests was filtered to remove water and post dried at 50° C. Silica was analyzed for inorganic element impurities content.

The results of the comparison are presented in Table 4 below:

TABLE 4

| ppm ICP OES | Control Silica | 1 g 10% citric solution | 2 g 10% citric solution | 4 g 10% citric solution | 8 g 10% citric solution | 10 g 10% citric solution |
|---|---|---|---|---|---|---|
| Li | 10 | 5 | 5 | 5 | 5 | 5 |
| Al | 136 | 38 | 39 | 37 | 38 | 35 |
| B | 22 | 3 | 4 | 4 | 3 | 2 |
| Ca | 87 | 38 | 38 | 31 | 30 | 30 |
| Fe | 130 | 50 | 47 | 46 | 40 | 36 |
| K | 34 | 12 | 13 | 11 | 12 | 11 |
| Mg | 27 | 20 | 20 | 19 | 19 | 18 |
| Na | 5 | 4 | 4 | 3 | 4 | 4 |
| P | 47 | 40 | 47 | 45 | 42 | 41 |
| Total | 498 | 210 | 217 | 201 | 193 | 182 |

These test results show that it is possible to further reduce the residual inorganic substances in the silica, thus creating levels of impurities for each market application requirement.

Experiment 6

Several tests were conducted using a procedure to reintroduce the desired inorganic element into a control pretreated rice hull sample where most of the inorganic contaminants had been removed. The inorganic contaminant, usually from a salt solution with a given concentration, was sprayed on to a dry rice hull sample with vigorous agitation for full incorporation and wetting of the rice bulls. The concentrations of desired contaminant were calculated based on the elemental quantity on each solution and the silica quantity on each rice hull sample. The wetting was calculated in such a way that the rice hulls were capable of absorbing all the excess water so that the distribution of the elemental impurity would be uniform.

Wet samples were post dried in an oven and then calcined at different temperatures to evaluate surface area and pore volumes. Results of the experiments are presented below:

A lithium hydroxide solution was incorporated into a control rice hull sample with three different concentration targets measured on the calcined silica sample: 1,000 ppm, 2,000 ppm, and 3,000 ppm. The results of this experiment are presented in Table 5 below:

TABLE 5

| Metals ppm ICP OES | Control | 1,000 ppm Li | 2,000 ppm Li | 3,000 ppm Li |
|---|---|---|---|---|
| Li (lithium hydroxide) | 4 | 752 | 1,558 | 2,491 |
| %, relative to target | | (75%) | (78%) | (80%) |
| B | 9 | 10 | 10 | 10 |
| Mg | 30 | 28 | 27 | 33 |
| Zn | 4 | 21 | 5 | 4 |
| P | 276 | 283 | 279 | 306 |
| Al | 7 | 3 | 4 | 4 |
| Ca | 74 | 68 | 71 | 75 |
| Fe | 49 | 42 | 48 | 48 |
| K | 9 | 8 | 9 | 12 |
| Mn | 49 | 46 | 47 | 50 |
| Na | 3 | 3 | 5 | 9 |
| Total | 514 | 1,264 | 2,063 | 3,042 |
| SA (m$^2$/g) 600° C. | 391 | 280 | 247 | 221 |
| PV (cc/g) 600° C. | 0.40 | 0.31 | 0.29 | 0.27 |

The results in Table 5 show that the increased amounts of lithium in the rice hull had a significant effect in decreasing the surface area and pore volume of the calcined silica sample.

A potassium hydroxide solution was incorporated into a control rice hull sample with three different concentration targets measured on the calcined silica sample: 1,000 ppm, 2,000 ppm, and 3,000 ppm. The results of this experiment are presented in Table 6 below:

TABLE 6

| Metals ppm ICP OES | Control | 1,000 ppm K | 2,000 ppm K | 3,000 ppm K |
|---|---|---|---|---|
| K (potassium hydroxide) | 12 | 679 | 1,398 | 1,871 |
| % relative to target | | (68%) | (70%) | (62%) |
| Al | 14 | 9 | 47 | 18 |
| Ca | 81 | 85 | 87 | 85 |
| Mn | 52 | 52 | 53 | 52 |
| P | 231 | 248 | 253 | 248 |
| Li | 4 | 4 | 4 | 4 |
| B | 17 | 17 | 14 | 14 |
| Fe | 53 | 81 | 47 | 46 |
| Mg | 30 | 32 | 32 | 30 |
| Na | 4 | 7 | 5 | 4 |
| Zn | 6 | 6 | 6 | 6 |
| Total | 504 | 1,220 | 1,946 | 2,378 |
| SA (m$^2$/g) 600° C. | 387 | 330 | 300 | 286 |
| PV (cc/g) 600° C. | 0.40 | 0.34 | 0.32 | 0.31 |

The results in Table 6 show that the increased amount of potassium in the rice hull had a significant effect in decreasing the surface area and pore volume of the calcined silica sample.

Sodium hydroxide and sodium sulfate solutions were incorporated into a control rice hull sample with three different concentrations targets measured on the calcined silica sample: 1,000 ppm, 2,000 ppm, and 3,000 ppm. The results of this experiment are presented in Table 7 below:

TABLE 7

| Metals ppm ICP OES | Control | 1,000 ppm Na | 2,000 ppm Na | 3,000 ppm Na | 1,000 ppm Na | 2,000 ppm Na | 3,000 ppm Na |
|---|---|---|---|---|---|---|---|
| Na (sodium sulfate) % relative to target | 0 | 935 (93%) | 2,072 (104%) | 3,041 (101%) | | | |
| Na (sodium hydroxide) % relative to target | 0 | | | | 1,007 (100%) | 2,329 (116%) | 3,479 (116%) |
| Al | 12 | 23 | 55 | 22 | 11 | 143 | 109 |
| Ca | 109 | 113 | 129 | 118 | 113 | 116 | 111 |
| K | 9 | 8 | 12 | 12 | 9 | 12 | 11 |
| Mn | 80 | 73 | 78 | 78 | 76 | 75 | 75 |
| P | 298 | 305 | 346 | 353 | 318 | 332 | 347 |
| Li | 4 | 4 | 4 | 4 | 4 | 4 | 4 |
| B | 17 | 14 | 12 | 13 | 7 | 13 | 11 |
| Fe | 80 | 188 | 128 | 84 | 83 | 84 | 84 |
| Mg | 40 | 37 | 43 | 42 | 39 | 38 | 38 |
| Zn | 4 | 4 | 5 | 4 | 4 | 6 | 5 |
| Total | 653 | 1,704 | 2,887 | 3,771 | 1,671 | 3,152 | 4,274 |
| SA (m$^2$/g) 600° C. | 387 | 318 | 298 | 285 | 298 | 276 | 251 |
| PV (cc/g) 600° C. | 0.40 | 0.35 | 0.32 | 0.31 | 0.32 | 0.30 | 0.28 |

The results in Table 7 show that the increased amount of sodium in the rice hull had a significant effect in decreasing the surface area and pore volume of the calcined silica sample.

A calcium oxide solution was incorporated into a control rice hull sample with three different concentrations targets measured on the calcined silica sample: 1,000 ppm, 2,000 ppm and 3,000 ppm. The results of this experiment are presented in Table 8 below:

TABLE 8

| Metals ppm ICP OES | Control | 1,000 ppm Ca | 2,000 ppm Ca | 3,000 ppm Ca |
|---|---|---|---|---|
| Ca (calcium oxide) | 81 | 802 | 1,549 | 2,096 |
| % relative to target | | (80%) | (77%) | (70%) |
| Al | 14 | 10 | 13 | 16 |
| K | 12 | 14 | 13 | 12 |
| Mn | 52 | 53 | 53 | 51 |
| P | 231 | 232 | 247 | 250 |
| Li | 4 | 4 | 4 | 4 |
| B | 17 | 11 | 12 | 9 |
| Fe | 53 | 46 | 49 | 47 |
| Mg | 30 | 37 | 38 | 42 |
| Na | 4 | 3 | 4 | 3 |
| Zn | 6 | 5 | 4 | 4 |
| Total | 504 | 1,217 | 1,986 | 2,534 |
| SA (m$^2$/g) 600° C. | 387 | 385 | 375 | 370 |
| PV (cc/g) 600° C. | 0.40 | 0.40 | 0.39 | 0.39 |
| SA (m$^2$/g) 900° C. | 230 | 232 | 215 | 202 |
| PV (cc/g) 900° C. | 0.26 | 0.26 | 0.24 | 0.22 |

The results in Table 8 show that the increased amount of calcium in the rice hull had a moderate effect in decreasing the surface area and pore volume of the calcined silica sample.

A magnesium sulfate solution was incorporated into a control rice hull sample with three different concentrations targets measured on the calcined sample: 1,000 ppm, 2,000 ppm, and 3,000 ppm. The results of this experiment are presented in Table 9 below:

TABLE 9

| Metals ppm ICP OES | Control | 1,000 ppm Mg | 2,000 ppm Mg | 3,000 ppm Mg |
|---|---|---|---|---|
| Mg (magnesium sulfate) | 40 | 976 | 2,054 | 2,950 |
| % relative to target | | (98%) | (102%) | (98%) |
| Al | 12 | 11 | 22 | 17 |
| Ca | 109 | 112 | 121 | 123 |
| K | 9 | 21 | 38 | 59 |

TABLE 9-continued

| Metals ppm ICP OES | Control | 1,000 ppm Mg | 2,000 ppm Mg | 3,000 ppm Mg |
|---|---|---|---|---|
| Mn | 80 | 79 | 81 | 77 |
| P | 798 | 305 | 329 | 340 |
| Li | 4 | 4 | 4 | 4 |
| B | 17 | 10 | 10 | 8 |
| Fe | 80 | 82 | 84 | 85 |
| Na | 0 | 44 | 0 | 0 |
| Zn | 4 | 3 | 2 | 3 |
| Total | 653 | 1,647 | 2,745 | 3,666 |
| SA (m²/g) 600° C. | 387 | 369 | 364 | 352 |
| PV (cc/g) 600° C. | 0.40 | 0.39 | 0.38 | 0.38 |
| SA (m²/g) 900° C. | 214 | 222 | 195 | 197 |
| PV (cc/g) 900° C. | 0.27 | 0.26 | 0.23 | 0.24 |

The results in Table 9 show that the increased amount of magnesium in the rice hull had a moderate effect in decreasing the surface area and pore volume of the calcined silica sample.

Boric acid and zinc sulfate solutions were incorporated into a control rice hull sample with three different concentration targets measured on the calcined sample: 1,000 ppm, 2,000 ppm, and 3,000 ppm The results of this experiment are presented in Table 10 below:

TABLE 10

| Metals ppm ICP OES | 100818 Control | 1,000 ppm B | 2,000 ppm B | 3,000 ppm B | 1,000 ppm Zn | 2,000 ppm Zn | 3,000 ppm Zn |
|---|---|---|---|---|---|---|---|
| B (boric acid) % relative to target | 9 | 941 (94%) | 1945 (97%) | 3228 (108%) | 8 | 0 | 0 |
| Zn (zinc sulfate) % relative to target | 4 | 7 | 5 | 5 | 910 (91%) | 1969 (98%) | 2570 (86%) |
| Li | 4 | 4 | 4 | 4 | 4 | 4 | 4 |
| Mg | 30 | 31 | 28 | 36 | 91 | 35 | 30 |
| P | 276 | 268 | 270 | 307 | 277 | 273 | 275 |
| Al | 7 | 8 | 4 | 6 | 7 | 17 | 7 |
| Ca | 74 | 95 | 76 | 82 | 70 | 71 | 68 |
| Fe | 49 | 60 | 52 | 53 | 47 | 47 | 46 |
| K | 9 | 12 | 8 | 17 | 8 | 9 | 8 |
| Mn | 49 | 49 | 49 | 51 | 47 | 47 | 46 |
| Na | 3 | 17 | 3 | 3 | 2 | 8 | 3 |
| Flux | 116 | 155 | 115 | 138 | 171 | 123 | 109 |
| Total | 514 | 1492 | 2444 | 3792 | 1471 | 2480 | 3057 |
| SA (m²/g) 600° C. | 391 | 369 | 367 | 366 | 366 | 359 | 360 |
| PV (cc/g) 600° C. | 0.40 | 0.38 | 0.38 | 0.39 | 0.38 | 0.37 | 0.37 |
| SA (m²/g) 900° C. | 209 | 204 | 202 | 185 | 201 | 210 | 205 |
| PV (cc/g) 900° C. | 0.24 | 0.24 | 0.23 | 0.21 | 0.24 | 0.25 | 0.24 |

The results in Table 10 show that the increased amounts of boron and zinc in the rice hull had some effect on the surface area and pore volume, although the results did not indicate any trend.

Aluminum sulfate and manganese sulfate solutions were incorporated into a control rice hull sample with three different concentrations targets measured on the calcined sample: 1,000 ppm, 2,000 ppm, and 3,000 ppm. The results of this experiment are presented in Table 11 below:

TABLE 11

| Metals ppm ICP OES | 110718 Control | 1,000 ppm Mn | 2,000 ppm Mn | 3,000 ppm Mn | 1,000 ppm Al | 2,000 ppm Al | 3,000 ppm Al |
|---|---|---|---|---|---|---|---|
| Al (aluminum sulfate) % relative to target | 14 | 7 | 14 | 14 | 709 (71%) | 1399 (70%) | 1977 (66%) |
| Mn (manganese sulfate) % relative to target | 52 | 881 (88%) | 1790 (89%) | 2488 (83%) | 63 | 51 | 73 |
| K | 12 | 13 | 15 | 12 | 12 | 19 | 22 |
| Ca | 81 | 81 | 83 | 84 | 84 | 79 | 87 |
| P | 231 | 239 | 238 | 245 | 272 | 263 | 331 |
| Li | 4 | 4 | 4 | 4 | 4 | 4 | 4 |
| B | 17 | 11 | 13 | 12 | 13 | 12 | 10 |
| Fe | 53 | 44 | 47 | 44 | 49 | 48 | 48 |
| Mg | 30 | 25 | 25 | 19 | 32 | 35 | 39 |
| Na | 4 | 3 | 3 | 3 | 4 | 3 | 5 |

TABLE 11-continued

| Metals ppm ICP OES | 110718 Control | 1,000 ppm Mn | 2,000 ppm Mn | 3,000 ppm Mn | 1,000 ppm Al | 2,000 ppm Al | 3,000 ppm Al |
|---|---|---|---|---|---|---|---|
| Zn | 6 | 3 | 1 | 0 | 4 | 4 | 5 |
| Flux | 127 | 122 | 126 | 118 | 132 | 136 | 153 |
| Total | 504 | 1311 | 2233 | 2925 | 1246 | 1917 | 2601 |
| SA (m²/g) 600° C. | 387 | 381 | 375 | 379 | 379 | 379 | 380 |
| PV (cc/g) 600° C. | 0.40 | 0.39 | 0.39 | 0.39 | 0.39 | 0.39 | 0.40 |
| SA (m²/g) 900° C. | 230 | 222 | 236 | 221 | 255 | 249 | 252 |
| PV (cc/g) 900° C. | 0.26 | 0.25 | 0.27 | 0.25 | 0.28 | 0.27 | 0.28 |

The results in Table 11 show that aluminum and manganese do not have an impact of the properties of calcined silica.

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

We claim:

1. A process for producing porous amorphous silica having a controlled surface area, said porous amorphous silica being derived from siliceous plant matter, said siliceous plant matter containing at least one flux agent, the process comprising the steps of:
    a) heat treating said siliceous plant matter in the presence of oxygen at a temperature wherein the resulting silica is comprised of silica of porous amorphous form with no detectable crystalline structure,
wherein, the amount of said at least one flux agent in said siliceous plant matter and/or the heat treatment temperature are controlled, thereby producing amorphous silica having a controlled surface area within a specified narrow band within the range of 10 m²/g and 450 m²/g, and wherein the amount of said at least one flux agent in the siliceous plant matter is controlled by mixing the desired amount of said at least one flux agent into the siliceous plant matter.

2. The process of claim 1, wherein said amount of said at least one flux agent in said siliceous plant matter is manipulated by controlling the amounts of chelating agent in said siliceous plant matter.

3. The process of claim 2, wherein the chelating agent is selected from the group consisting of citric acid, acetic acid, ethylenediamine, ethylenediaminetetracetic acid, di mercapto succinic acid, trimethylaminetricarboxylic acid, alphalipoic acid, and diethylenetriaminepentaacetic acid.

4. The process of claim 3, wherein the amount of chelating agent is from 0.001 kg per kg of plant matter to 1 kg per kg of plant matter.

5. The process of claim 4, wherein the chelating agent is citric acid and the amount of citric acid is from 0.01 kg per kg of plant matter to 0.1 kg per kg of plant matter.

6. The process of claim 1, wherein the amount of said at least one flux agent in said siliceous plant matter is controlled by introducing at least one mineral acid into said siliceous plant matter.

7. The process of claim 6, wherein said at least one mineral acid is selected from the group consisting of sulfuric acid, nitric acid, hydrochloric acid, phosphoric acid, boric acid, and perchloric acid.

8. The process of claim 1, wherein the amount of said at least one flux agent can be controlled from 20 ppm to 25,000 ppm.

9. The process of claim 1, wherein the surface area of said amorphous silica is controlled in a specified narrow band within the range of 30 m²/g and 400 m²/g by controlling the amount of said at least one flux agent in the siliceous plant matter and/or the heat treatment temperature.

10. The process of claim 1 wherein the pore volume of said amorphous silica is controlled in a specified narrow band within the range of 0.50 cc/g and 0.05 cc/g by controlling the amount of said at least one flux agent in the siliceous plant matter and/or the heat treatment temperature.

11. The process of claim 10, wherein the pore volume of said amorphous silica is controlled in a specified narrow band within the range of 0.40 cc/g and 0.10 cc/g by controlling the amount of said at least one flux agent in the siliceous plant matter and/or the heat treatment temperature.

12. The process of claim 1, wherein the pore diameter of said amorphous silica is controlled in a specified narrow band within the range of 10 Angstroms and 200 Angstroms by controlling the amount of said at least one flux agent in the siliceous plant matter and/or the heat treatment temperature.

13. The process of claim 12, wherein the pore diameter of said amorphous silica is controlled in a 20 Angstroms range within the range of 30 Angstroms and 100 Angstroms by controlling the amount of said at least one flux agent in the siliceous plant matter and/or the heat treatment temperature.

14. The process of claim 1 wherein the amount of said at least one flux agent in the in the siliceous plant matter, is controlled in a specified narrow band within the range of 300 ppm and 15,000 ppm.

15. The process of claim 1, wherein the content of said at least one flux agent in the heat treated silica is controlled in a specified narrow band within the range of 10 ppm and 1,000 ppm by post washing the silica with at least one of water, mineral acids, chelants, and pH adjustment chemicals and subsequently reheating the silica.

16. The process of claim 15, wherein the content of said at least one flux agent in the heat treated silica is controlled in a specified narrow band within the range of 100 ppm and 500 ppm by post washing the silica with at least one of water, mineral acids, chelants, and pH adjustment chemicals and subsequently reheating the silica.

17. The process of claim 1, wherein said heat treatment temperature is in the range of 200° C. to 1,000° C.

18. The process of claim 1, wherein said at least one flux agent is comprised of at least one of lithium, sodium, potassium, magnesium, calcium, aluminum, boron, iron, manganese, titanium or phosphorus.

19. The process of claim 1 wherein said amount of said at least one flux agent in said siliceous plant matter is chemically controlled.

20. The process of claim 1, wherein said amount of at least one flux agent and heat treating temperature are controlled to prevent formation of crystalline structures in said amorphous silica.

21. A process for production of porous amorphous silica from siliceous plant matter containing non-siliceous inorganic matter comprising the steps of:
   a) soaking said siliceous plant matter in an aqueous solution comprising a chelating agent wherein said chelating agent is present in an amount which extracts at least some of said non-siliceous inorganic matter;
   b) separating the aqueous solution from said siliceous plant matter;
   c) controlling the amount of at least one preselected non-siliceous inorganic substance in said siliceous plant matter by mixing a desired amount of preselected non-siliceous inorganic matter into the siliceous plant matter, said at least one preselected non-siliceous inorganic substance selected to impart beneficial properties to the siliceous plant matter; and
   d) heat treating said siliceous plant matter in the presence of oxygen at a temperature wherein the resulting silica is comprised of silica of porous amorphous form.

22. A process for producing porous amorphous silica having a controlled surface area, said porous amorphous silica being derived from siliceous plant matter, said siliceous plant matter containing at least one flux agent, the process comprising the steps of:
   a) heat treating said siliceous plant matter in the presence of oxygen at a temperature wherein the resulting silica is comprised of silica of porous amorphous form with no detectable crystalline structure, wherein, the amount of said at least one flux agent in said siliceous plant matter and/or the heat treatment temperature are controlled, thereby producing amorphous silica having a controlled surface area within a specified narrow band within the range of 10 $m^2/g$ and 450 $m^2/g$, and wherein at least one flux agent is added to said amorphous silica prior to heat treatment of said siliceous plant matter at a temperature in the range of 200° C. to 1,000° C., thereby controlling at least one of the surface area, pore volume, and pore diameter of said amorphous silica within target specifications.

* * * * *